Figure 10:
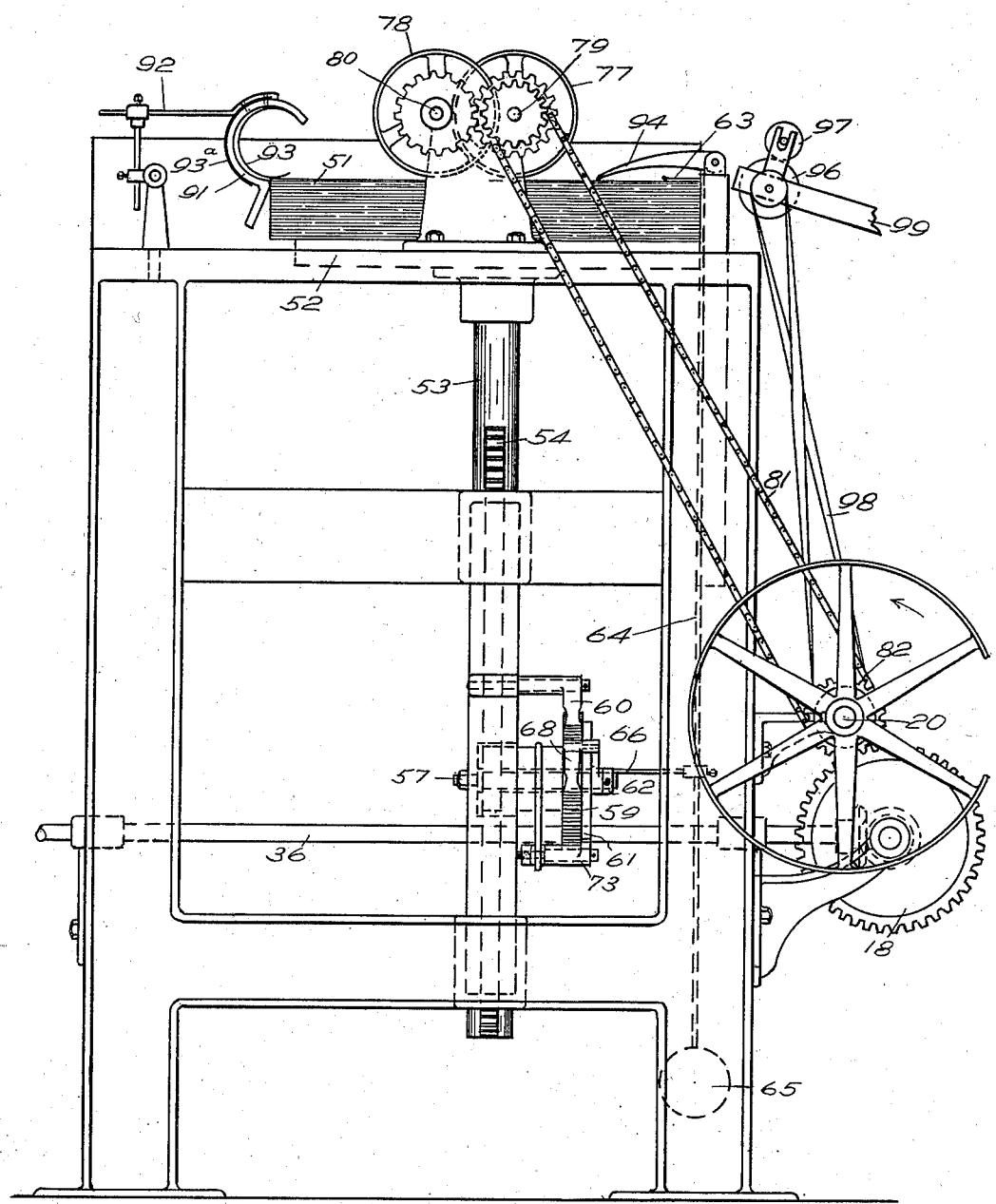

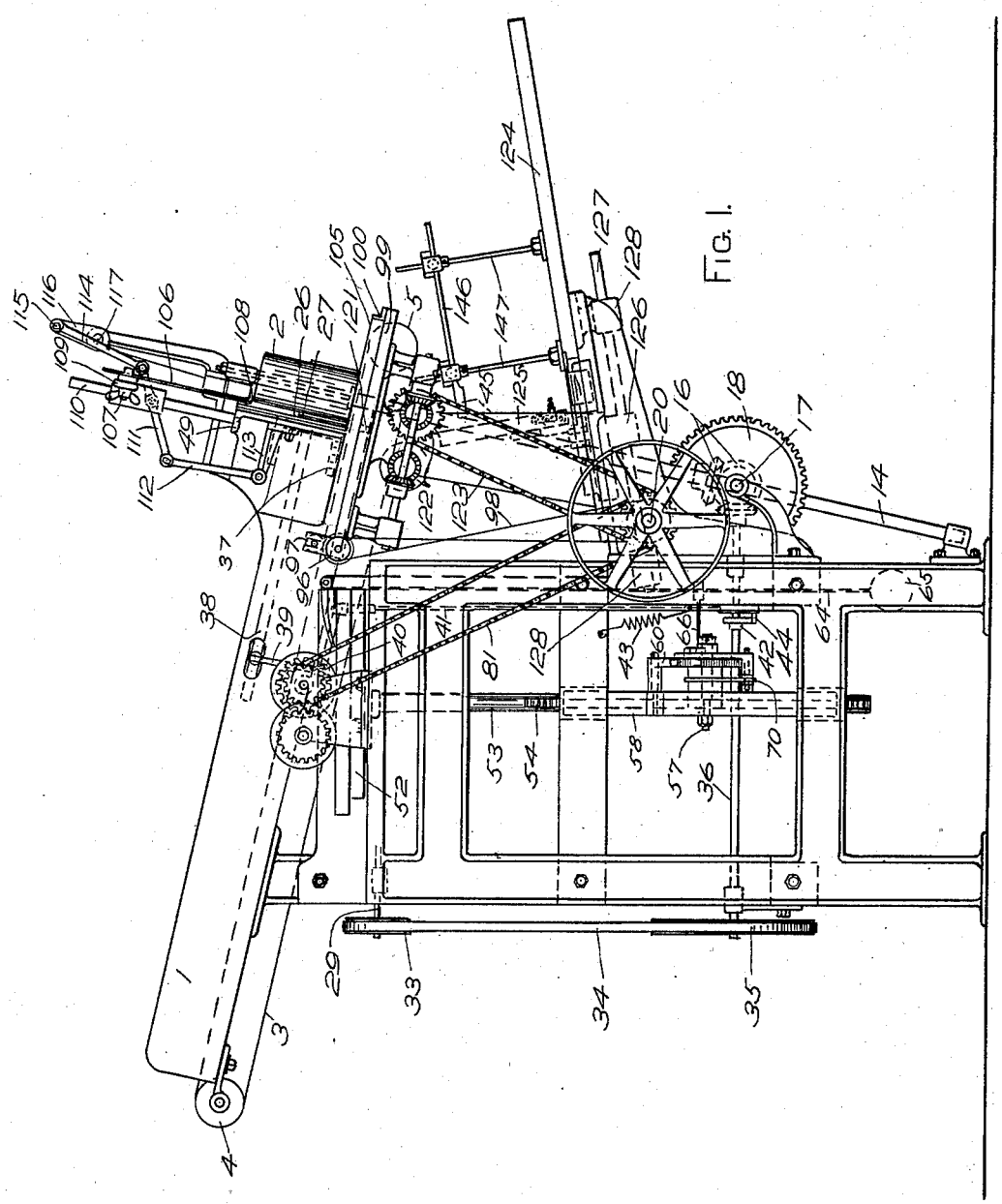

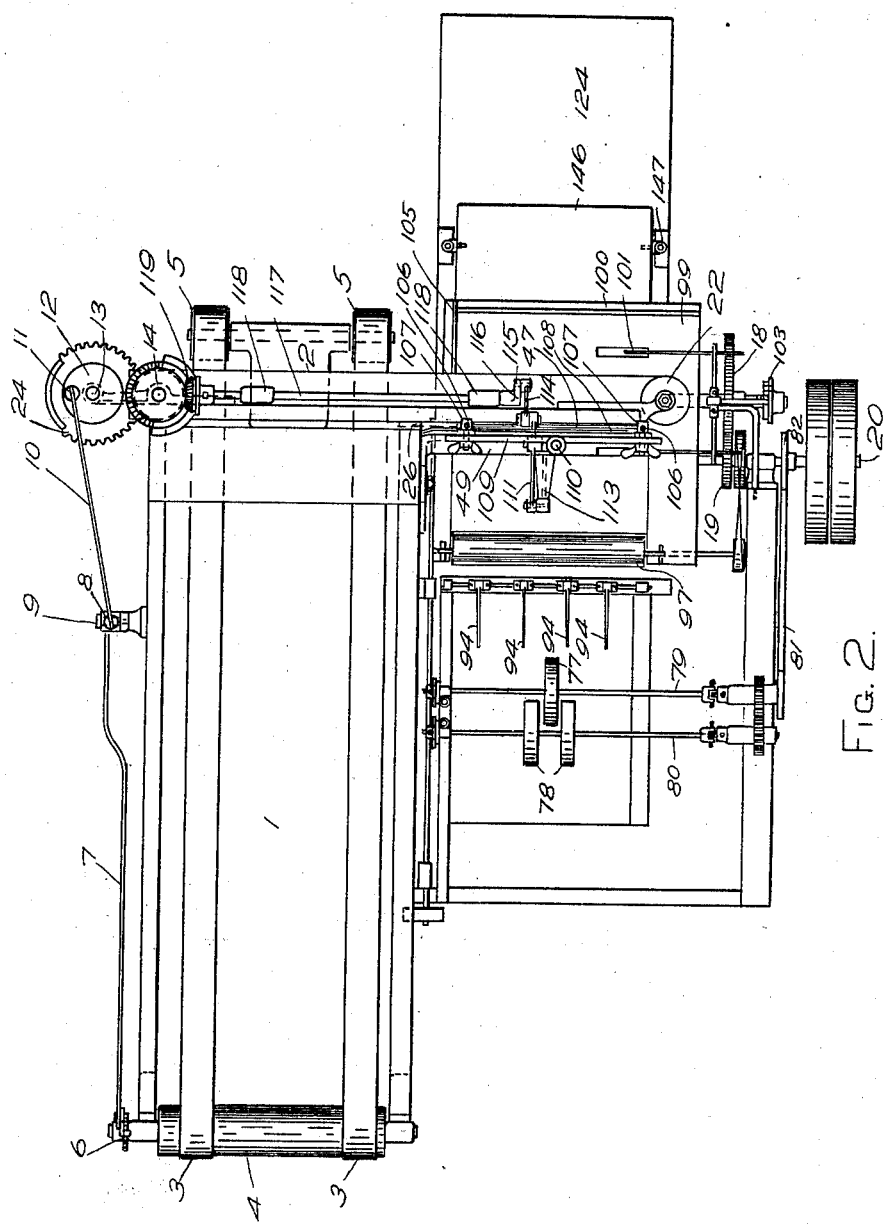

No. 747,999. PATENTED DEC. 29, 1903.
A. H. MORTON & L. P. SHERMAN.
BOOK COVERING MACHINE.
APPLICATION FILED SEPT. 26, 1902.
NO MODEL. 7 SHEETS—SHEET 3.
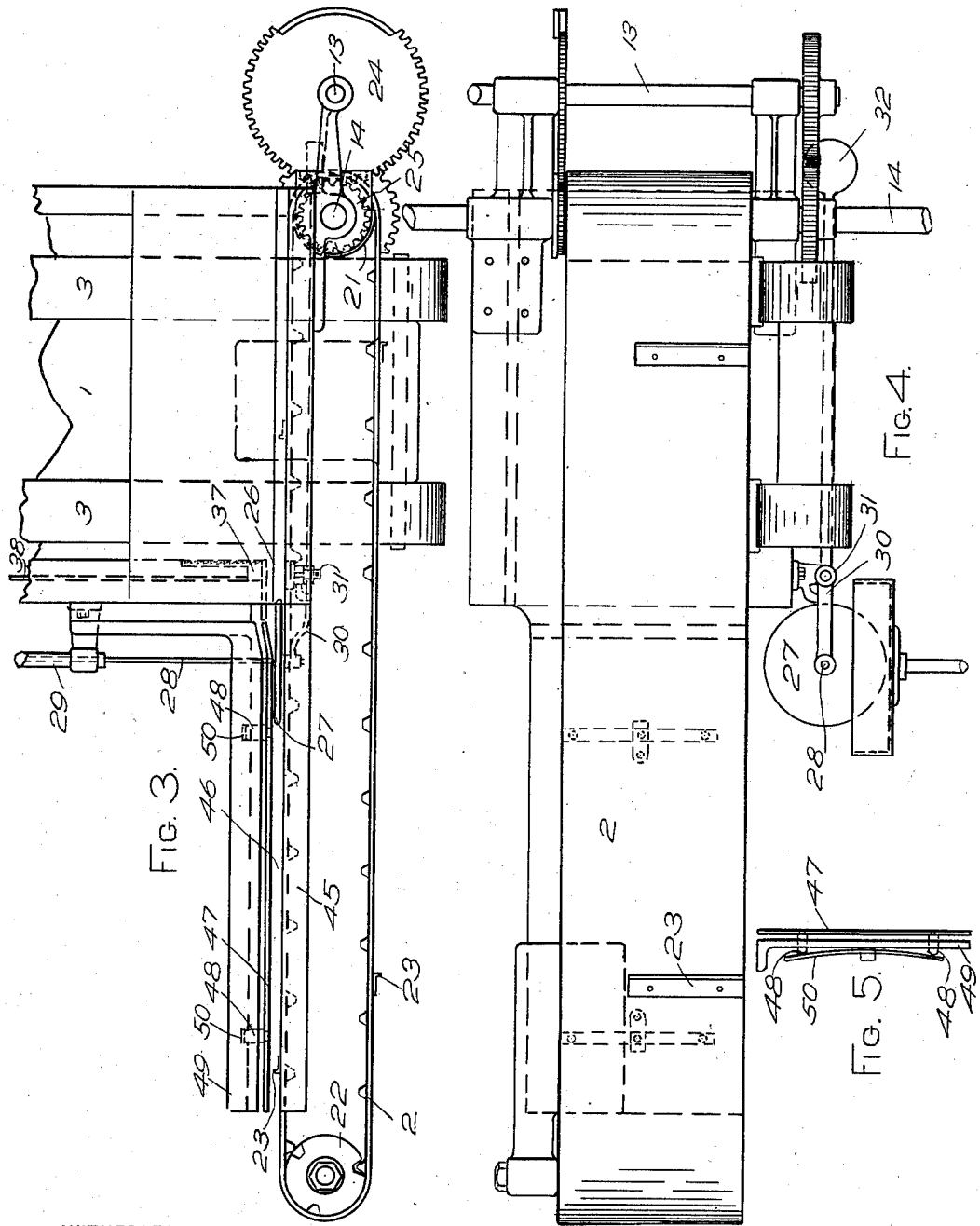
WITNESSES:
Alfred H. Aldreth
Farnum D. Dorsey
INVENTORS
Albert H. Morton
Lewis P. Sherman
BY
Phillips Van Everen & Fish
ATTORNEYS.

No. 747,999. PATENTED DEC. 29, 1903.
A. H. MORTON & L. P. SHERMAN.
BOOK COVERING MACHINE.
APPLICATION FILED SEPT. 26, 1902.
NO MODEL. 7 SHEETS—SHEET 4.
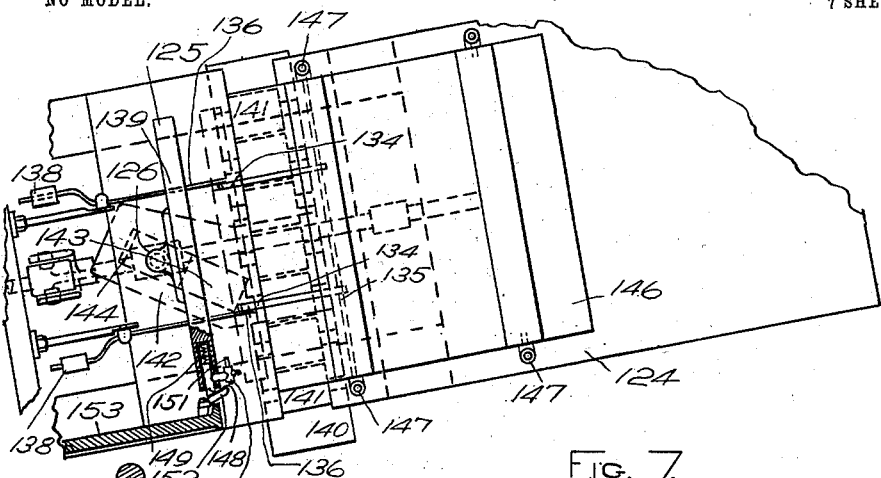
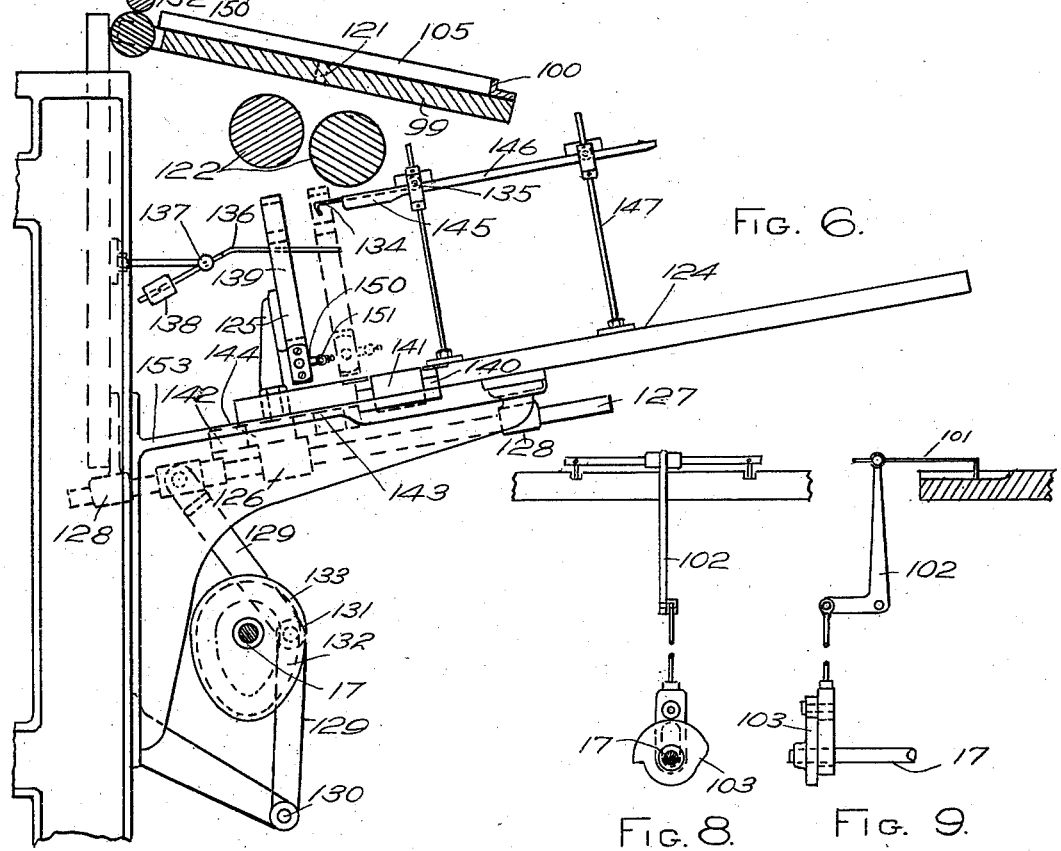
WITNESSES:
Alfred H. Hildreth
Barnum D. Dorsey
INVENTORS
Albert H. Morton
Lewis P. Sherman
BY
Phillips Van Everen & Fish
ATTORNEYS.

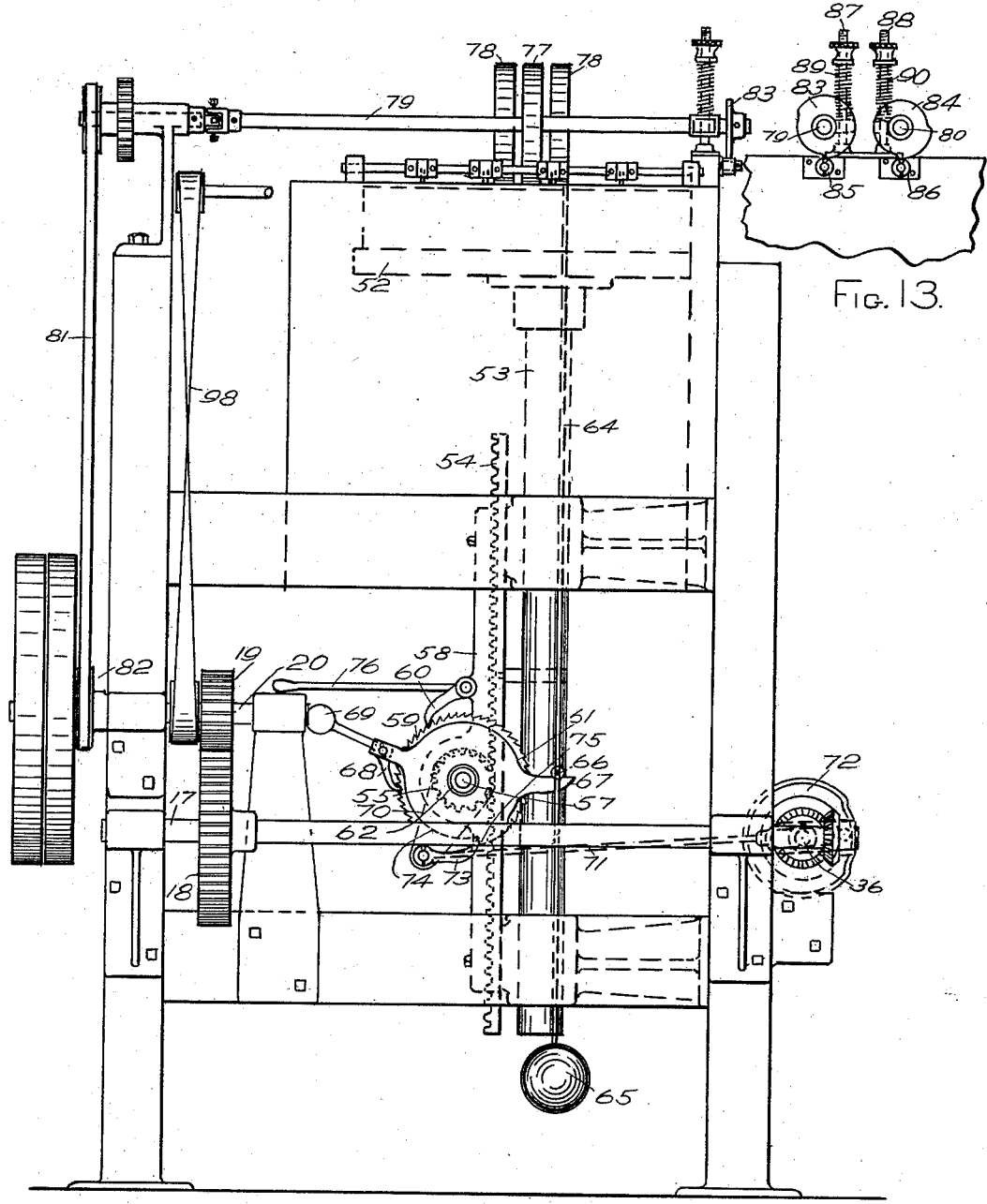

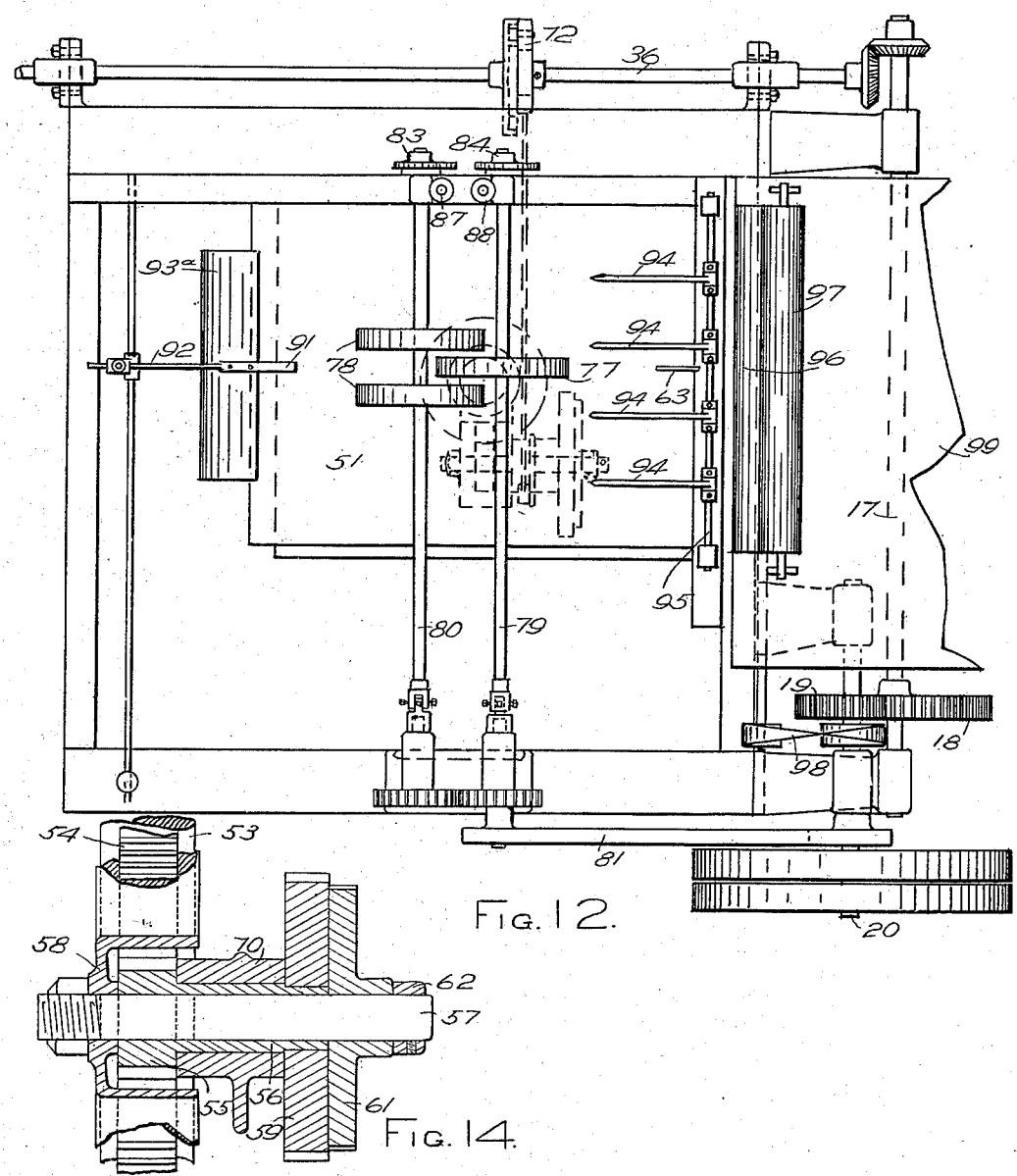

No. 747,999. Patented December 29, 1903.

UNITED STATES PATENT OFFICE.

ALBERT H. MORTON AND LEWIS P. SHERMAN, OF LOWELL, MASSACHUSETTS, ASSIGNORS TO SAID MORTON AND HAVEN C. PERHAM, OF LOWELL, MASSACHUSETTS.

BOOK-COVERING MACHINE.

SPECIFICATION forming part of Letters Patent No. 747,999, dated December 29, 1903.

Application filed September 26, 1902. Serial No. 124,943. (No model.)

*To all whom it may concern:*

Be it known that we, ALBERT H. MORTON and LEWIS P. SHERMAN, citizens of the United States, residing at Lowell, in the county of Middlesex and State of Massachusetts, have invented certain new and useful Improvements in Book-Covering Machines; and we do hereby declare the following to be a full, clear, and exact description of the invention, such as will enable others skilled in the art to which it appertains to make and use the same.

The present invention relates to an improvement in book-covering machines, and more particularly to the covering of books or pamphlets, such as magazines and the like, with a paper cover.

The object of the invention is to reorganize and improve machines for covering books, in order to render them more rapid, efficient, and certain in operation, as well as to produce a simple and durable mechanism for this purpose.

The invention consists in the devices and combinations of devices hereinafter described, and particularly defined in the claims.

In the accompanying drawings, illustrating a preferred form of the invention, Figure 1 is a side elevation of the machine. Fig. 2 is a plan of the same. Fig. 3 is a plan of the book-feeding and book-transferring mechanisms. Fig. 4 is a front elevation of the same, and Fig. 5 is a detail hereinafter described. Fig. 6 is a side elevation of the book-delivery mechanism and associated mechanism. Fig. 7 is a plan of the same arranged in rectangular projection from Fig. 6. Fig. 8 is a front and Fig. 9 a side elevation of the covering-registering mechanism. Fig. 10 is a side elevation, Fig. 11 a front elevation, and Fig. 12 a plan, of the cover-feeding mechanism; and Figs. 13 and 14 are details of a portion of the cover-feeding mechanism.

In the illustrated embodiment of the present invention the books to be covered are placed on an inclined table with their backs downward and are fed down the table by means of an apron or belts. From the lower end of the table the books are fed out laterally with reference to the table by means of an intermittently-moving belt. The cover-feeding mechanism takes a cover from the top of a pile of covers and delivers it to a table underneath the book in its position of presentation to the cover. During the passage of the book from the lower end of the inclined table to the position over the cover the book-back is gummed or glued by passing over a glue-roll. The table is provided at its middle with a slot, and a pusher pushes the book down against the cover and through the slot in the table, thereby bending the cover around the book. After the book passes down through the slot in the table it passes between two rollers, which engage the sides of the cover, press the cover against the sides of the book, and pull the book down through the slot. The book then drops to the lower end of an inclined table and a reciprocating presser engages the side of the book and presses it up against the previously-covered books. In this position smoothing-rolls are moved back and forth underneath the back edge of the book and operate to smooth and set the book-cover against the book and to square the edges and conform the cover smoothly to the book-back. Means are also provided for insuring the correct register of the cover on the book after the book has fallen on the inclined delivery-table, which fall sometimes disturbs the register by the jar incident thereto.

Having thus described the general operation of the machine, the description of the specific embodiment of the invention, illustrated in the accompanying drawings, is as follows: In this description a signature or group of signatures will be referred to as the "book," and the pieces of paper or other material which are bent around and secured to the signature or group of signatures will be referred to as the "cover."

The mechanism for supporting a stack of books to be covered comprises a trough 1, mounted upon one side of the frame of the machine in a slightly-inclined position. The sides of the trough constitute guides for the stack of the books contained therein, and the end of the trough is closed by an intermittently-moving belt 2, against which the end book in the trough rests. The bottom of the trough, constituting an inclined table, is provided with carrier-belts 3, which extend from end to end thereof at opposite sides of the bottom of the trough, such belts being mounted upon rollers 4 5. By inclining the table the books may be placed thereon from time to time by the attendant and will travel down the incline without the necessity for a support behind them to hold them up and which must be removed in replenishing the books. The roller 4 is intermittently and progressively rotated by means of a ratchet-and-pawl mechanism 6, actuated by a connecting-rod 7, connected to an oscilating lever 8, pivoted at 9 upon the side of the trough, which in turn is connected by the rod 10 to the crank-pin 11, mounted in the disk 12, secured upon the upper end of the rotating shaft 13. The shaft 13 is operated by gears from the shaft 14, which is mounted in bearings from the frame of the machine and driven by bevel-gears 16 from the auxiliary shaft 17, in turn driven by the gear 18, secured thereon, which meshes with a gear 19, mounted on the main shaft 20 of the machine.

The books being stood on their backs, resting on the belts 3 3, and the bottom book resting with its side against the transferrer-belt 2, are progressively presented to the transferrer-belt by the belts 3 3, above described. The transferrer-belt 2 is conveniently constructed of a leather belt mounted on rollers 21 and 22, of which the latter is an idler-roller. The belt is provided on the outside with cleats 23, secured to the belt at proper intervals, and on the inside with cleats to register with corresponding recesses in the roller 21, so that the timing of the belt may be accurately determined. The roller 21 is loosely mounted upon the shaft 14 and actuated by a mutilated-gear motion from the shaft 13, consisting of the mutilated gear 24 and gear 25, mounted, respectively, upon the shaft 13 and the roller 21. By this means the end book of the books resting in the trough or chute is engaged by one of the cleats 23, which constitute means for moving books from the lower end of the trough and moved laterally out of the lower end of the trough through the opening 26 in one side thereof. As the book moves along out of the trough 1, being carried by the transferrer-belt 2, its back passes over the glue-roll 27, which is mounted upon a shaft 28, pivotally connected at one end to the hollow rotating shaft 29 and supported at its opposite end by the lever 30, pivotally supported at 31 upon the frame of the machine and counterbalanced by a weight 32, secured to the other end of the lever 30. The glue-roll 27 is rotated by means of the shaft 29, the pulley 33, mounted on said shaft, the belt 34, running over said pulley, and the pulley 35, mounted on the shaft 36, driven by bevel-gears on the auxiliary shaft 17, as illustrated best in Fig. 1.

The surface of the glue-roll is preferably convex in cross-section, as shown particularly in Fig. 3. This form of surface of the glue-roll applies the glue in a uniform and satisfactory manner to the surface of the back of the book. It will be observed that the central portion of the periphery of the glue-roll 27 engages the middle of the back of the book and that the glue applied to the book is applied in a manner which prevents the accumulation of a thick layer of glue at the edges of the book-back. This secures a coating of glue for the back of the book sufficient in quantity to securely hold the cover thereon and at the same time avoids an excessive quantity of glue, which would squeeze out on the sides of the book instead of being confined to the back thereof, as is desirable. The inner side of the trough 1, adjacent to the opening 26, is provided with a book-end pusher 37, the inner edge of which is toothed, as seen in Fig. 3, so as to advance the vertical edges of the books into the opening 26 to thereby prevent the folding back of the upper signatures of the book as it is being pushed out of the trough by the transferrer-belt 2. The book-end pusher is adjustably secured to the rod 38, which slides in the side of the trough and which is actuated by the bell-crank lever 39, pivoted at 40 to the side of the trough and in turn actuated by the connecting-rod 41, secured to the other end of the bell-crank lever 39, and which is actuated by a cam 42 on the rotary shaft 36, before referred to, a spring 43 acting normally to lift the rod 41, so as to hold the pin 44 against the surface of the cam 42. By these means the end pusher 37 is caused to move toward the lower end of the trough simultaneously with the feeding motion of the belts, and by engaging the vertical edges of the ends of the books and advancing them it insures the correct position of the book to be fed into the opening 26. The transferrer-belt, which moves a book from its position at the end of the trough 1 to the position underneath the pusher, which pushes the book down against the cover, is held in a fixed plane by the belt-support 45, against which it rests in its passage from the end of the trough 1 until it reaches the desired position. The transferrer-belt engages the bottom book in the trough and moves it endwise out of the trough through the opening 26 therein, over the glue-roll 27, where the back of the book is glued, and thence into the space 46, where it is held by the spring-plate 47 (illustrated in end elevation in Fig. 5) until the pusher, hereinafter described, descends and pushes the book downward. The spring-plate 47 is supported by pins 48, which pass through corresponding holes in the plate 49, the ends of which pins are engaged by the springs 50, which springs are secured at their middle to the plate 49. In this manner the spring-plate 47 is held with a yielding force against the book which has been brought into the space 46 by the transferrer-belt 2.

This position of the book may aptly be described as the position of presentation to the cover, as it is the position in which the book is held in correct position with relation to the cover and just before the book is forced downward, in the manner presently to be described, into engagement with the cover. Before proceeding to a description of the device for pushing the book downward it will be convenient to refer to the means for feeding the cover into the position underneath the book in its position of presentation to the cover.

The cover-feeding mechanism illustrated in the drawings is the one which it is preferred to employ in connection with the present invention; but other forms of cover-feeding mechanism might be employed, and so far as the present invention is concerned it is not limited to any particular form of cover-feeding mechanisms.

A pile of covers 51 is laid upon the platen 52, supported upon the upper end of the rod 53, mounted in suitable guideways in the frame of the machine. Upon one side of the rod 53 is secured a rack 54, which is engaged by a pinion 55, having a hub 56, which is supported by the stud 57, secured in the support 58. The ratchet-wheel 59 is secured to the hub 56 and is held from rotation, so as to prevent the rod 53 from descending, by means of the pawl 60, pivoted upon a part of the frame of the machine and which engages the teeth of the ratchet-wheel 59. Means are employed for actuating the pinion 55 at proper times in order to maintain the upper sheets of the pile of covers 51 at a uniform height. These means consist of the plate 61, which is pivotally and loosely mounted upon the stud 57, being held in place thereon by the collar 62, which is secured to said stud. A feeler 63 engages the upper surface of the pile 51 of covers and is connected by means of a rod 64, hanging down from the feeler 63, and normally held in contact with the upper surface of the paper by the weight 65, secured to the lower end of the rod 64. The pin 66 is secured to the rod and engages a projection 67 from the side of the plate 61. A pawl 68 is pivotally attached to the plate 61 and normally held in engagement with the teeth of the ratchet-wheel 59 by means of the weight 69, attached to said pawl. An oscillating lever 70 is pivotally mounted upon the hub 56, hereinbefore referred to, being actuated by a connecting-rod 71 from a cam 72 on the shaft 36, so that at each rotation of the shaft 36 an oscillating movement is imparted to the lever 70. The lever 70 carries at its end a pawl 73, which slides back and forth upon the surface 74 of the plate 61. The surface 74 terminates at a shoulder 75, which when the feeler 63 descends far enough will be brought into position to be engaged by the pawl 73 in its forward movement, which will thereby turn the plate 61 to the left, as viewed in Fig. 11, thereby moving the ratchet-wheel 59 to the left, so that the pawl 60 may engage the next successive tooth, thereby rotating the hub 56, to which the ratchet-wheel 59 is attached, and in turn rotating the pinion 55 through a small arc, and so lifting the bar 53. When it is desired to allow the bar 53 to drop in order to put additional covers upon the platen 52, the operator will take hold of the hand-lever 76, which is secured to the pawl 60, and lift it, and at the same time will lift the pawl 68, thereby lifting both pawls out of engagement with the ratchet-wheel 59 and permitting the bar 53 to descend by its own weight.

The above-described arrangement will, it will be understood from the foregoing description, operate whenever the upper sheet of the pile of covers supported by the platen 52 descends far enough to permit the ratchet-wheel 59 to be rotated by the means described through an arc equal to one tooth of its surface, and the upper surface of the pile of covers will be thus maintained very accurately at a certain level determined by the feeler 63. The platen 52 will only be raised whenever the pile of covers upon it has been lowered to the extent corresponding to one tooth of the ratchet-wheel 59.

The upper sheet of the pile of covers 51 is in position to be engaged by sandpaper-wheels 77 and 78, mounted, respectively, upon the shafts 79 and 80, which are geared together, as shown, and continuously rotated in opposite directions by the sprocket-chain 81, running from a sprocket-wheel 82, on the main shaft 20 of the machine. The sandpaper-wheels 77 and 78 are alternately lowered into contact with the upper sheet of paper upon the pile 51 by any suitable means, such as the cams 83 and 84, mounted upon the ends of the shafts 79 and 80, respectively, which cams rest upon rollers 85 and 86. The shafts 79 and 80 are both provided with universal joints connected so that the rolls 77 and 78 may be raised and lowered. The bearings for the movable ends of the shafts 79 and 80 are supported upon pins 87 and 88 and normally held in their lowermost position by springs 89 and 90. The pressure of the springs may be regulated to vary the pressure of the sandpaper-wheels on the paper, as may be necessary. A paper-separator 91 is mounted at the rear end of the pile 51 of the covers, being supported by the support 92. The paper-separator 91 is curved, as shown, and its inner surface is roughened or file-toothed for a purpose which will be presently described. A spring 93, secured at the end of the separator 91, normally rests upon the upper surface of the pile of covers and guides the edges of the covers into contact with the paper-separator 91. A paper-guide 93ª, consisting of a piece of sheet metal secured to the back of the separator 91, acts to support and guide the paper into the separator. At the front edge of the pile are arranged a series of pivotally-mounted fingers 94, which are supported by a rod 95, adjacent to the paper pile. The loose ends of these fingers rest lightly upon the upper surface of the paper. These fingers have sharp ends and operate in a manner presently to be described. Feed-rollers 96 and 97, of which the former is driven by a cross-belt 98 from the main shaft 20 of the machine, serve to carry the paper from the pile after it has been separated therefrom and presented to such rollers. The upper feed-roller 97 is loosely mounted in open bearings and presses lightly on the upper surface of the paper, coöperating with the lower feed-roller 96, which is provided with a sandpaper surface, to feed the paper therethrough. After the paper has passed through the feed-rollers 96 and 97 it slides down upon the inclined table 99 against the end-registering guide 100. The side register of the paper is secured by the pushers 101, which have vertical ends sliding in grooves in the upper surface of the table 99. After the sheet of paper has slid down upon the table 99 against the end guide 100 the side-registering pushers 101 are actuated by means of the bell-crank lever 102, in turn operated by a cam 103 upon the auxiliary shaft 17, hereinbefore described.

The separation of a piece of paper from the pile 51 is accomplished in the following manner by the mechanism just described: The sandpaper-rolls 78 are first brought into engagement with the upper surface of the top sheet of the pile by a drop of the shaft 80 through the cam 84 upon its end. The engagement of the rolls 78 with the upper surface of the top piece upon the pile moves the top piece of paper rearwardly, and the friction between the sandpaper-roll 78 and this piece of paper is sufficient to overcome the resistance offered by the rough surface of the paper-separator 91, and this sheet is slid up between the spring 93 and the paper-separator. The next sheet of paper being the piece of paper immediately underneath the top sheet may also be slid rearwardly at the same time; but the roughened surface of the separator 91 is sufficient to resist the tendency of this second sheet of paper to move up the surface of the separator, because the friction between the two top sheets of paper is not as great as the friction between the sandpaper-rolls 78 and the top piece of paper, as a result of which the top piece of paper will be moved rearwardly, being curled up in the guide 93ª until its front edge is moved rearwardly beyond the ends of the fingers 94. Then the shaft 80 will be lifted by its cam, and the shaft 79 will be permitted to descend by its cam, and rotating in the opposite direction it will engage the top sheet of paper and slide it forwardly out of the separator 91, its forward edge sliding up over the fingers 94 and entering between the rollers 96 and 97. The rotation of the roll 77 is continued until the front edge of the top sheet of paper has been entered between the feed-rollers 96 and 97, whereupon the roll 77 will be lifted by its cam, and the feed-rolls 96 and 97, which conveniently rotate at a considerably-faster speed than the roll 77, will carry the paper forward and deliver it to the inclined table 99, down which it will slide until it engages the end guide 100, whereupon the side registering device 101 will engage the paper and push it laterally until the rear edge of the paper engages the side guide 105, which position of the paper is its position of presentation to the book. Thus it will be seen that the registering of the book and the cover is accurately accomplished.

Having thus described the feeding of the books to their position of presentation to the cover and the feeding of the covers to the position of presentation to the book, the description will now continue to set forth the construction and mode of operation of the remainder of the machine.

The book-pusher 106 consists of a piece of wire having two vertically-extending portions, which are received in clamps 107, and the horizontal portion 108, which connects the two vertical portions and lies parallel to the upper edge of the book when the book occupies its position of presentation to the cover. The clamps 107 are mounted upon the slide 109, which is supported by the guide 110, upon which the slide reciprocates. The book-pusher is reciprocated up and down by means of the following mechanism: The lever 111, pivotally attached to the slide 109, has one end pivotally secured to the connecting-rod 112, which in turn is pivotally secured to the standard 113, projected rearwardly from the plate 49, hereinbefore referred to. The forward end of the lever 111 is pivotally attached to the connecting-rod 114, which has its opposite end pivotally connected to the crank-pin 115, mounted in the crank-arm 116 and carried by the intermittently-rotated shaft 117, mounted in bearings 118 upon the frame of the machine and intermittently rotated by means of the mutilated-gear motion, consisting of the gears 119, mounted, respectively, upon the end of the shaft 117 and upon the upper end of the shaft 14. The inclined table 99 is provided underneath the book in its position of presentation with a slot 121, through which upon the descent of the book-pusher 106 the book is forced, thereby folding the cover of the book around it and pushing the book and its cover down through said slot between the feed-rollers 122, which are mounted upon shafts geared together by bevel-gears, as shown in Fig. 1, the one of the two feed-rollers 122 carrying a sprocket-wheel which receives a sprocket-chain 123, which is driven from the main shaft of the machine. It is to be noted that the slot in the inclined table and the rollers 122 constitute in the illustrated embodiment of the invention book-guiding means for guiding the books in their passage through the machine. The book, with its cover, having been passed downward by the feed-rollers 122, drops upon the inclined delivery-table 124, the book-presser 125 standing at this time in the position illustrated in full lines, Fig. 6, so that the book may drop down between the presser 125 and the books previously covered. The book-presser 125 now advances, moving from the position illustrated in full lines, Fig. 6, to the position illustrated in dotted lines, Fig. 6, thereby forcing the book which has just been covered up against the books which have previously been covered. The book-presser is mounted upon a slide 126, which is secured to the slide-rod 127, mounted in bearings 128, secured to a stationary part of the machine, said reciprocating rod 127 being actuated by a cam-lever 129, pivoted at 130 at a stationary part of the machine and carrying a cam-roll 131, which engages a cam-path 132 in the cam-disk 133, mounted upon the auxiliary shaft 17. It is to be noted in this connection that the auxiliary shaft 17 makes one rotation to each operation of the machine. The books as they are covered and pressed up the inclined table 124 pass under hooks 134, which are loosely pivoted upon the rod 135 and under which the upper edges of the books are slid. The hooks 134 rise as the presser 125 advances and fall after the book has been advanced to the position which it will occupy when the book-presser 125 occupies the position illustrated in dotted lines in Fig. 6, thereby retaining the book in the position to which it has just been pressed. It sometimes happens that the edges of the cover lying against the surface of the pusher 125 will fall when the pusher returns to its full-line position in Fig. 6, and in order to maintain the cover against the book and to prevent it from gaping open as the pusher 125 retires, in which case the next succeeding book might be inserted between the cover and the book of the next previous book, there are provided leaf-supporters 136, pivotally mounted at 137 upon a portion of the machine, such leaf-supporters being provided with balance-weights 138, which normally tend to hold the operative ends of the leaf-supporters up in the position illustrated in Fig. 6. These leaf-supporters therefore operate to hold the cover of the book up against the book after the withdrawal of the presser until the next book shall have descended into the space between the previously-covered book and the pusher, whereupon the leaf-supporters are pressed out of the way by the next descending book, returning to the position illustrated in Fig. 6, when the presser shall have advanced to the position illustrated in dotted lines in Fig. 6. The presser 125 is provided with slots 139, through which the ends of the leaf-supporters 136 project.

A book-back-smoothing device is provided on the table 124, which operates to smooth and roll the backs of the books, so as to square the corners of the book and efficiently to secure the covers to the books. A slide 140 is provided, which is adapted to reciprocate transversely in a guideway in the inclined table 124, and in bearings on it are mounted a series of rollers 141. The amplitude of reciprocation of the slide 140 is slightly greater than the distance between the centers of the rolls 141, so that the reciprocations of the rolls against the back of the book will roll the entire surface thereof. The slide 140 is provided with a lateral projection 142, which is provided with a slot 143, which receives a block 144, mounted upon the slide 126. The slot 143 is inclined to the direction of motion of the slide 126, so that as the slide 126 reciprocates in the direction of the length of the inclined table 124 the slide 140 will be reciprocated transversely thereto. It is preferred that the rollers 141 should be of such length as to extend over the backs of a plurality of books, whereby each book receives more than a single rolling action of the rollers 141 and has as many rolling actions as the thickness of the book is contained in the length of the rollers 141. In order to support the books with a pressure greater than their weight against the action of the rollers 141, a wedge-shaped pressing-surface 145, mounted above the upper edges of the books, is provided, which engages the edges of the books as they are forced up by the presser 125 and holds them with the proper pressure against the action of the rollers 141. The pressing-surface 145 is supported by a plate 146, adjustably mounted on standards 147, so that the surface 145 may be adjusted up and down to meet the requirements of various sizes of books. The book-back-smoothing device as a separate device is not peremptorily necessary for the successful operation of the book-covering machine of this application, as it has been found that satisfactory results may be accomplished by the smoothing and squaring action of the book-presser 125.

The means for insuring the correct register of the cover on the book consist of the following mechanism: A slide 148 is slidingly mounted in bearings in the lower part of the presser 125 parallel to the surface of the inclined table 124. A spring 149 normally tends to force the slide 148 outward. An arm 150 projects from the side of the slide 148 out through a slot in the side of the presser 125 adjacent to the books. The rod 151 is adjustably mounted in the arm 150, and its end is adapted to engage the book in its cover just after the same has fallen on the table 124 and to move the book therein, the glue being still moist, to its correct position. The movement of the rod 151 is timed to take place after the book-presser 125 has started and before its pressing movement is completed—that is to say, before the book is under pressure. The end of the slide 148 is engaged by a cam 152 during the first part of the forward motion of the presser and is forced by the cam to operate as described. After the rod 148 passes the cam the spring 149 ejects the slide again. Upon the return movement of the presser the slide 148 engages the cam, and the cam being pivotally supported on the bar 153 is moved rearwardly until the slide passes out from under it, when it falls back into its original position. By providing end guides for the book the cover may be made to register with either end or located centrally with relation thereto.

It will be seen that the books are delivered by the machine by being pressed up the table 124 and that the books are free to be removed as fast as they pass up the table, there being no pressure against the end of the stack of books necessary to be exerted in order to secure the proper operation of the machine, this pressure being secured by the engaging of the book between the pressing-surface 145 and the upper surface of the table 124, so that the resistance to the forward movement of the presser 125 offered by the pressing of the books between the pressing-surface 145 and the table is sufficient to cause the presser 125 to engage and compress the cover against the book with the proper pressure to secure its being well molded thereto, so that it will fit the same properly.

While the illustrated embodiment of the invention constitutes the form of the invention in which it is preferably embodied, still it is distinctly to be understood that the invention is by no means limited to such embodiment, as other means may be employed for carrying out the invention without departure therefrom.

In connection with the invention described and claimed herein there is illustrated and described mechanism for feeding the covers to their position of presentation to the books. No claim to that mechanism is made, however, as it forms the subject of another application for Letters Patent executed of even date herewith and to which reference is had.

Having thus described the specific form of the invention illustrated in the accompanying drawings, what is claimed is—

1. A book-covering machine, having, in combination, means for covering books, an inclined table upon which a stack of books may stand on edge for supplying books to the said covering means, and inclined means for supporting the lower end of the stack of books and removing the books singly therefrom, substantially as described.

2. A book-covering machine, having, in combination, an inclined table upon which a stack of books may stand on edge and an intermittently-moving belt for removing books from the lower end of the stack, the said belt closing the lower end of the table and being substantially perpendicular thereto, substantially as described.

3. A book-covering machine, having, in combination, an inclined belt upon which a stack of books may stand on edge, means for intermittently actuating the belt to move the edges of the books downward, a transferrer-belt for supporting the lower end of the stack and removing books therefrom, and means for intermittently actuating the transferrer-belt, the actuation of the two belts being timed to alternate with each other, substantially as described.

4. A book-covering machine, having, in combination, an inclined table upon which a stack of books may stand on edge, means for removing books edgewise from the lower end of the stack, and means for engaging the vertical edges of the books near the lower end of the stack and moving them down the incline, substantially as described.

5. A book-covering machine, having, in combination, an inclined table upon which a stack of books may stand on edge, means for removing books edgewise from the lower end of the stack, means for engaging the lower edges of the books to advance the same successively into a position to be removed, and means for engaging the vertical edges of the books near the lower end of the stack to move them down the incline, substantially as described.

6. A book-covering machine, having, in combination, book-covering means, a support for a stack of books, means for taking one book at a time from the end of the stack and transferring it to a position of presentation to the cover comprising an endless belt, and elastic book-holding means coöperating with the belt to engage the sides of the book and support the same after it has been removed from the stack, substantially as described.

7. A book-covering machine, having, in combination, a table for supporting a stack of books, an intermittently-moved transferrer-belt for transferring the books from the bottom of the stack to the position of presentation to the cover, a spring-pressed plate coöperating with the transferrer-belt to yieldingly hold the book in such position, and means for pushing the book edgewise from such position, substantially as described.

8. A book-covering machine, having, in combination, means for supporting a stack of books on edge, a transferrer-belt intermittently operated to transfer the book at the end of the stack from the stack to the position of presentation to the cover, means for gluing the back of the book as it passes from the stack to the position of presentation, and yielding stationary means engaging one side of the book and supporting it during the time of transferal but permitting the book while in position of presentation to be moved transversely to the direction of its motion during said transferal and means adapted so to move the book, substantially as described.

9. A book-covering machine, having, in combination, means for supporting a stack of books, means for transferring the books from the stack to the position of presentation to the cover, means for yieldingly holding the book in said position, a cover-supporting device, and means for moving the book from its said position to and against the cover of the book and folding the cover against the sides of the book, substantially as described.

10. A book-covering machine, having, in combination, means for supporting a stack of books, means for feeding the books to the position of presentation to the cover, a table provided with a slot to support a cover, means for moving the book into contact with the cover over the slot in the table and passing the book through the slot in the table, substantially as described.

11. A book-covering machine, having, in combination, means for supporting and feeding books to the position of presentation to the cover, an inclined table for holding a cover in position of presentation to the book provided with an edge and a side guide, and a registering device for pressing the cover against one of the guides, substantially as described.

12. A book-covering machine, having, in combination, means for supporting and feeding books to the position of presentation to the cover, an inclined table for holding a cover in position of presentation to the book provided with an end guide and a side guide, one of said guides being at the lower side of said table so that the cover may be held thereagainst by gravity, and a registering device for pressing the cover against the other guide, substantially as described.

13. A book-covering machine, having, in combination, means for supporting a stack of books, means for feeding the books to the position of presentation to the cover, a table provided with a slot for holding the cover, means for pushing the book against the cover over the slot, and pressing it part way through the slot, and means for pulling the book through the slot, substantially as described.

14. A book-covering machine, having, in combination, means for holding a book, means for holding a cover consisting of a slotted table provided with a guide, and registering means for moving the cover into contact with the guide so that the book shall be correctly presented to the cover, substantially as described.

15. A book-covering machine, having, in combination, book-feeding means, cover-feeding means, rigid cover-supporting means provided with a slot, and means for presenting the book and cover to each other and passing both through the said slot, substantially as described.

16. A book-covering machine, having, in combination, book-feeding means to feed the books to the position of presentation to the cover, a cover-supporting table provided with a slot, means for moving a book against a cover on the table and passing it through said slot, and means for pressing the books, substantially as described.

17. A book-covering machine, having, in combination, automatic book-feeding means, automatic cover separating and feeding means, means for folding the cover around the book, book-delivering means comprising an inclined table upon which the books are delivered on edge, means for pressing the side of the book after the application of the cover, and means for smoothing and squaring the back of the covered book, substantially as described.

18. A book-covering machine, having, in combination, means for holding a book in position of presentation to the cover, comprising surfaces yieldingly engaging the sides of the book, means for holding the cover in position to receive the book, and a pusher to engage the edge of a book while held by said surfaces and move it edgewise therefrom into engagement with the cover, substantially as described.

19. A book-covering machine, having, in combination, a delivery-table, book-guiding means to deliver books on edge to the end of said table, a pressing-surface for engaging the upper edges of the books, and means for pressing the lattermost of said books, the said delivery-table and pressing-surface coöperating to resist the movement of the said books along the delivery-table by the said pressing means, substantially as described.

20. A book-covering machine, having, in combination, an inclined delivery-table, book-guiding means to deliver books on edge to the lower edge of said table, a pressing-surface for engaging the upper surface of the lowermost book of the stack, and means for pressing the sides of the books, the said table and pressing-surface serving by their relative position and the inclination of the table to resist the movement of the books up the delivery-table so that the pressing means shall exert the greater pressure on the books, substantially as described.

21. A book-covering machine, having, in combination, book-covering means, an inclined delivery-table, book-guiding means for guiding the book from the book-covering means to the lower end of the delivery-table, a pressing-surface located above and substantially parallel with the upper surface of the delivery-table at a distance therefrom slightly less than the width of a book, adapted to engage the upper edges of the lowermost books of the stack, and an intermittently-reciprocating presser for pressing the lowermost books of the stack, said delivery-table and pressing-surface coöperating to impede the movements of the books upward along the delivery-table thereby to increase the pressure of the presser upon the books, substantially as described.

22. A book-covering machine, having, in combination, a table for receiving covered books, a reciprocating presser for intermittently pressing against and retracting from the last book delivered to the table, a pressing-surface engaging the upper edges of the books, and means located opposite the pressing-surface for smoothing and squaring the backs of the books, substantially as described.

23. A book-covering machine, having, in combination, a table for receiving covered books, a reciprocating pusher for moving books in a stack along said table, means for delivering books to the table with their backs downward, an edge-engaging member for engaging the upper edges of the books, and means for smoothing the backs of the books, the pusher and edge-engaging member being adapted to give respectively lateral and vertical support to the books while the back-smoothing means are acting, substantially as described.

24. A book-covering machine, having, in combination, a table upon which the books are delivered, a reciprocating presser for pressing them thereon, means for engaging the upper margin of the cover of the last book on the table, and means for engaging the upper part of said cover, while the presser is receding, below the point of engagement of the first-mentioned means, substantially as described.

25. A book-covering machine, having, in combination, a table upon which the books are delivered, a reciprocating presser, pivoted hooks for engaging the upper margins of the books, and leaf-supporters for engaging the cover of the books, substantially as described.

26. A book-covering machine, having, in combination, a table upon which the books are delivered, a reciprocating presser for pressing the books as they are delivered to the table, and means for supporting the cover of the last book pressed as the presser recedes comprising members displaced by the next succeeding book as it is delivered to the table and assuming their operative position as such book is advanced by the presser, substantially as described.

27. A book-covering machine, having, in combination, means for applying a cover to a book, and means for subsequently moving relatively the book and the cover before they are fixed together in order that they may register properly, substantially as described.

28. A book-covering machine, having, in combination, means for folding a cover upon a book, means for engaging the cover after its application to prevent edgewise movement thereof, and means for engaging the edge of the book thereafter to move the book within the cover and adjust it with relation thereto, substantially as described.

29. A book-covering machine, having, in combination, an inclined table for holding a stack of books to be covered, a similarly-inclined table to hold the cover while in its position of presentation to the book, and a transferrer-belt to transfer books from the first table to the second, the belt being substantially perpendicular to the said tables, substantially as described.

30. A book-covering machine, having, in combination, an inclined table upon which a stack of books may stand on edge in an inclined position, means for feeding the books from the lower end of the stack to the position of presentation to the cover, means for covering the books, including means for delivering them in an inclined position, and an inclined table at the bottom of which the books are delivered in such inclined position by the covering means, substantially as described.

31. A book-covering machine, having, in combination, an inclined belt upon which a stack of books may stand on edge, means for intermittently actuating the belt to move the edges of the books downward, and an intermittently-actuated transferrer-belt substantially perpendicular to the said inclined belt, substantially as described.

In testimony whereof we affix our signatures in presence of two witnesses.

ALBERT H. MORTON.
LEWIS P. SHERMAN.

Witnesses:
HORACE VAN EVEREN,
BENJAMIN PHILLIPS.